United States Patent
Korich et al.

(10) Patent No.: US 7,449,853 B2
(45) Date of Patent: Nov. 11, 2008

(54) HIGH POWER, LOW NOISE INTERCONNECTION FOR AN INTEGRATED DUAL WOUND MOTOR TO A DUAL INVERTER

(75) Inventors: Mark D. Korich, Chino Hills, CA (US); Mark L Selogie, Hermosa Beach, CA (US); Constantin C. Stancu, Anaheim, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/217,868

(22) Filed: Sep. 1, 2005

(65) Prior Publication Data
US 2007/0046223 A1  Mar. 1, 2007

(51) Int. Cl.
*H02P 6/00* (2006.01)
(52) U.S. Cl. .................................. 318/400.01
(58) Field of Classification Search .......... None
See application file for complete search history.

(56) References Cited

U.S. PATENT DOCUMENTS

| | | | |
|---|---|---|---|
| 5,341,075 A * | 8/1994 | Cocconi | 318/139 |
| 5,877,601 A * | 3/1999 | Obara et al. | 318/139 |
| 6,166,937 A * | 12/2000 | Yamamura et al. | 363/141 |
| 6,380,719 B2 * | 4/2002 | Underwood et al. | 322/36 |
| 6,501,172 B1 * | 12/2002 | Fukada et al. | 257/707 |
| 6,865,080 B2 * | 3/2005 | Radosevich et al. | 361/699 |
| 6,898,072 B2 * | 5/2005 | Beihoff et al. | 361/676 |
| 6,909,607 B2 * | 6/2005 | Radosevich et al. | 361/699 |
| 6,940,715 B2 * | 9/2005 | Beihoff et al. | 361/689 |
| 2006/0055432 A1 * | 3/2006 | Shimokawa et al. | 327/5 |
| 2006/0057768 A1 * | 3/2006 | Nakanishi et al. | 438/106 |

FOREIGN PATENT DOCUMENTS

WO   WO 2004053984 A1 *  6/2004

* cited by examiner

*Primary Examiner*—Renata McCloud

(57) ABSTRACT

A high current interconnection system is provided which can be configured to couple a motor to an inverter. A high current interconnection system comprises a bus bar, a motor winding coupled to the bus bar, and a thermal interface. The motor winding is configured to receive a current. The thermal interface can be coupled to at least one of the motor winding or the bus bar. The thermal interface is configured to reduce a temperature of the motor winding or bus bar which the thermal interface is coupled to.

8 Claims, 2 Drawing Sheets

HIGH POWER, LOW NOISE INTERCONNECTION FOR AN INTEGRATED DUAL WOUND MOTOR TO A DUAL INVERTER

TECHNICAL FIELD

The present invention generally relates to electric motors and more particularly to automotive power electronics used in electric motors and, even more particularly, to techniques for providing interconnections between an alternating current (AC) electric motor and an inverter.

BACKGROUND

Electric and hybrid vehicles typically include an alternating current (AC) electric motor which is driven by a DC power source, such as a high voltage storage battery which can run, for example, at 250 V DC. The AC electric motor runs on an alternating current. Motor windings of the AC electric motor can be coupled to inverter module(s) by an AC interconnection system which includes an AC bus bar for carrying the alternating current.

The inverter module is a power supply which converts the DC power from the battery to AC power which drives or runs the AC electric motor. A stator of the AC electric motor includes a number (e.g., three) of motor windings. The alternating current goes into the motor windings and powers the AC electric motor. A connector connects the AC motor to the inverter. The bus bar can be made of copper.

Each inverter module can include a current sensor or sensors which are coupled to the bus bars. The current sensors measure the alternating current generated by the inverter, and feed the measurements back to a controller which monitors the alternating current.

FIG. 1 is a schematic diagram of a conventional electric motor system. The conventional electric motor system includes an inverter module 20, a bus bar 18, an intermediate bus bar 17, a motor winding 16, and an electric motor 10. The inverter module 20 is coupled to the bus bar 18 which is coupled to the intermediate bus bar 17 which is coupled to the motor winding 16 which is part of the electric motor 10. The inverter module 20 sends an alternating current to the bus bar 18. The bus bar 18 sends the alternating current to the intermediate bus bar 17. The bus bar 18 has an AC current sensor assembly 12 coupled to the bus bar 18 which senses or measures the alternating current. The intermediate bus bar 17 sends the alternating current to the motor winding 16 where it drives or runs the electric motor 10.

The recent popularity of hybrid electric cars has increased the use of high density power electronics in an "under the hood" environment where temperatures in the engine compartment can often reach 125 C. or more. Due to the high temperatures in such environments, it has become particularly important to provide techniques for dealing with the effects of high temperatures on the power electronics used in such environments.

Unfortunately, the system of FIG. 1 requires the use of fasteners between the motor windings 16 and the intermediate bus bar 17 and between the intermediate bus bar 17 and the bus bars 18 which can increase the cost of the interconnection system. Moreover, these fasteners have resistances associated therewith which can undesirably introduce electrical noise. In addition, crimping of the intermediate bus bar 17 can also be problematic.

In addition, in some cases the AC current sensor assemblies 12 used to sense current traveling along the bus bar 18 can be susceptible to failure when used in high current and/or high temperature environments. For example, off the shelf current sensors may be rated, for instance, to a maximum operating temperature of 105 C. To deal with these high temperatures, vehicle manufacturers have been forced to use custom current sensors which are designed and rated for high temperature applications or environments and can withstand the operating temperatures in such environments. However, these current sensors are relatively expensive, and it would be desirable to provide techniques which can allow cheaper or lower rated current sensors to be used in an under the hood environment.

Notwithstanding these advances, there is a need for high current/power AC interconnection systems which can be used, for example, to connect a motor to an inverter. It would be desirable to reduce the cost and size of such interconnection systems. It would also be desirable to reduce and possibly eliminate the number of interconnections needed between components of the interconnection system to reduce EMI noise. There is also a need for a high current, low noise AC interconnection system which can be used, for example, to connect an integrated dual wound motor to a dual inverter. It would also be desirable to use cheaper, off-the-shelf current sensors despite the high temperature operating conditions. Other desirable features and characteristics of the present invention will become apparent from the subsequent detailed description and the appended claims, taken in conjunction with the accompanying drawings and the foregoing technical field and background.

SUMMARY

A high current interconnection system is provided which can be configured to couple a motor to an inverter. A high current interconnection system comprises a bus bar, a motor winding coupled to the bus bar, and a thermal interface. The motor winding is configured to receive a current. The thermal interface can be coupled to at least one of the motor winding or the bus bar. The thermal interface is configured to reduce a temperature of the motor winding or bus bar which the thermal interface is coupled to.

BRIEF DESCRIPTION OF THE DRAWINGS

The present invention will be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Definitions

As used herein, the word "exemplary" means "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As used herein, the term "winding" refers to one or more turns of a conductor wound in the form of a coil. A winding may refer to coils that are wound around a conductor (core) which produce electrical energy if moved within a magnetic field. In an AC induction motor, the primary winding is a stator or wire coils inserted into slots within steel laminations. The secondary winding of an AC induction motor is usually not a winding at all, but rather a cast rotor assembly.

As used herein, the term "bus bar" refers to a conductor used to connect two or more circuits. A bus bar is a separate element that is coupled to an inverter module and that is not part of the inverter module. A bus bar can be made of a conductive material, such as copper or aluminum.

As used herein, the term "wound motor" refers to a motor with the rotor wound into definite poles.

As used herein, the term "inverter" refers to a circuit or other device which converts direct current (DC) power to alternating current (AC) power, usually with an increase in voltage. For example, an inverter can convert low voltage DC electricity produced by a fuel cell (or other source) to high voltage AC power for use by a motor.

As used herein, the term "heat sink" refers to matter which absorbs heat to lower the temperature of a device by dissipating heat into the surrounding air or other matter the heat sink is coupled to.

As used herein, the term "clamp" refers to a device used to surround or compress a thing. A clamp has opposing, often adjustable sides or parts for bracing objects or holding them together.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

Figure 1:
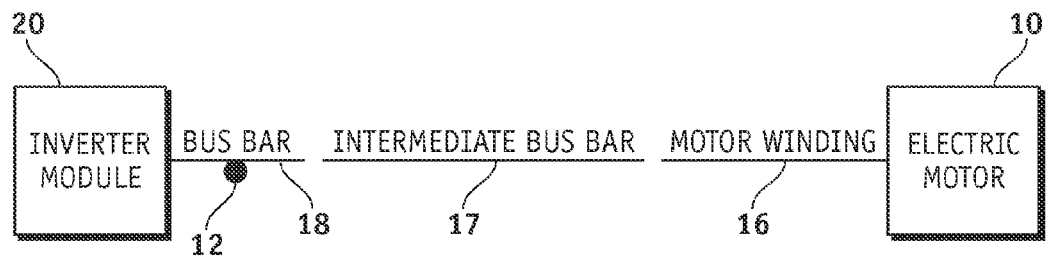
FIG. 1 is a schematic diagram of a conventional electric motor system.

Each connection has thermal resistance and electrical resistance associated with it. Because the intermediate bus bar of FIG. 1 carries an AC current it can act as an EMI radiation source. It would be desirable to eliminate the intermediate bus bar since a connection can be eliminated, and a potential radiation source can also be eliminated. In addition, the cost of the bus bar and connections can be eliminated.

Exemplary System

Figure 2:
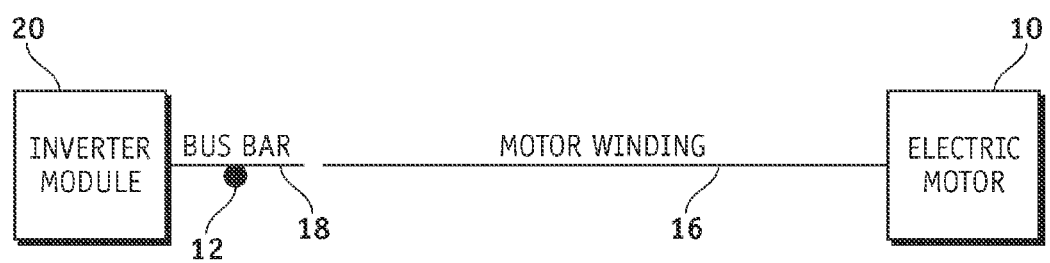
FIG. 2 is schematic diagram of a motor system which includes an AC interconnection system according to one exemplary embodiment.

FIG. 2 is schematic diagram of an electric motor system which includes an AC interconnection system according to one exemplary embodiment. This AC interconnection system can be used, for example, in applications requiring a high current, low noise terminal design. Although FIG. 2 shows the bus bar 18 as being a single bus bar, and the motor winding 16 as being a single winding, it should be appreciated that in a typical implementation, a dual wound motor (not shown) has a number of motor windings 16 which have a corresponding number of bus bars 18, as shown below in FIG. 3.

The electric motor system includes an inverter module 20, a bus bar 18, a motor winding 16, and an electric motor 10.

The inverter module 20 is coupled to the bus bar 18 which is directly coupled to the motor winding 16 which is part of the electric motor 10. The inverter module 20 sends an alternating current to the bus bar 18. The bus bar 18 has an AC current sensor assembly 12 coupled to the bus bar 18 which senses or measures the alternating current. The bus bar 18 sends the alternating current directly to the motor winding 16 where it drives or runs the electric motor 10.

In this embodiment, the motor winding 16 can be made longer and extended out of the motor. The motor winding 16 can be fed directly into the inverter module (or PIM) and bolted to the bus bar 18. This can allow for the inverter to be directly mounted onto the motor. As a result, the size and cost of the interconnection system can be reduced by eliminating the intermediate bus bar 17 of FIG. 1. In addition, fasteners or other connections, and the resistances associated with the fasteners, can also be eliminated to thereby reduce EMI noise. In addition, crimping of the intermediate bus bar 17 can also be eliminated. Thermal performance can also be improved by eliminating the intermediate bus bar 17.

Exemplary Implementation

Figure 3:
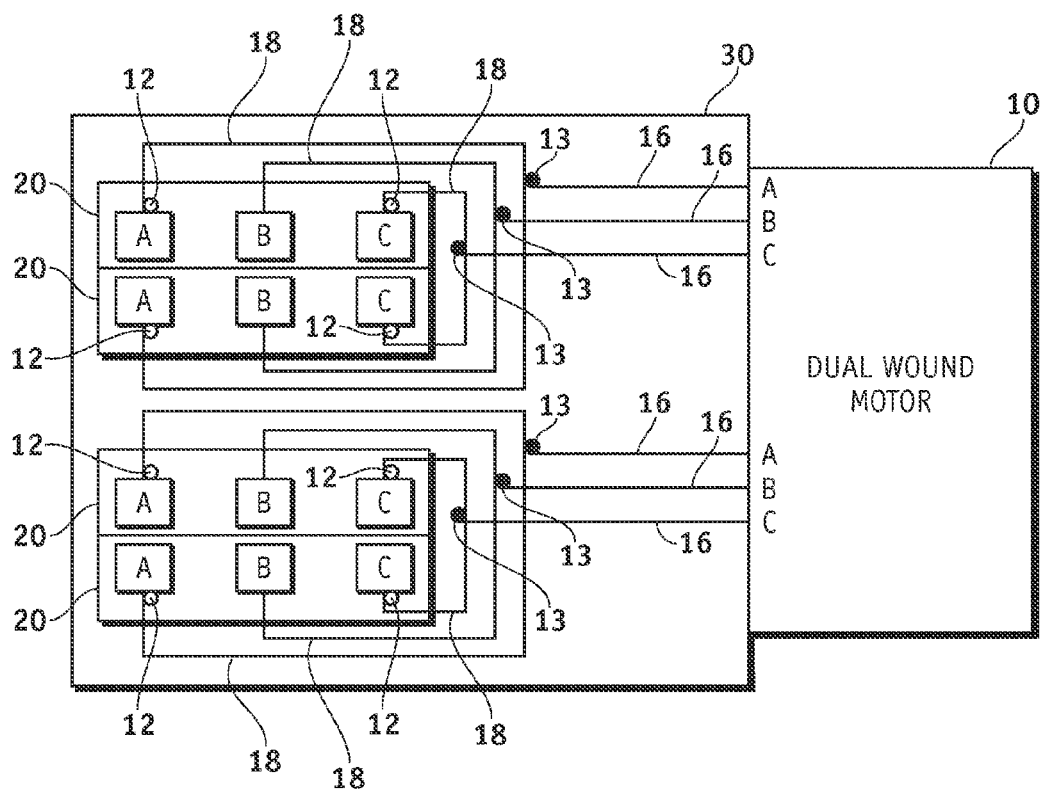
FIG. 3 is block diagram of a system which comprises a motor and a plurality of inverter modules coupled to each other by an AC interconnection system according to one exemplary embodiment.

FIG. 3 is block diagram of a system which comprises a motor 10 and a plurality of inverter modules coupled to each other by an AC interconnection system according to one exemplary embodiment. The system comprises a dual wound motor 10 and a plurality of inverter modules 20 coupled to each other by an AC interconnection system. The AC interconnection system comprises a plurality of AC current sensor assemblies 12, a plurality of lugs 13, a plurality of motor windings 16, and a plurality of bus bars 18. Although FIG. 3 shows the motor windings 16 as being a single winding, in one implementation, the motor windings 16 can be split into two equal bundles. Alternatively, single point connections can be used for each single wire bundle. This embodiment can provide a three phase AC interconnection system between a dual wound motor and two dual inverters. This AC interconnection system can be used, for example, in applications requiring a high current, low noise terminal design.

In this implementation, a quad power inverter module (PIM) 30 is shown which has four inverter modules 20, however, any number of inverter modules could be used depending upon the specific implementation. Each of the inverter modules 20 include three inverter sub-modules A, B, C. Each of the inverter sub-modules A, B, C comprise a dual switch, and the three dual switches can be used to represent the phases of a particular inverter sub-module. Stated differently, each inverter modules 20 includes a total of six switches—two switches in inverter sub-module A, two switches in inverter sub-module B, and two switches in inverter sub-module C.

Each inverter module 20 can be coupled to a corresponding bus bar 18 which can be directly coupled to a corresponding motor winding 16 of the electric motor 10 via a corresponding lug 13. Each of the inverter modules 20 comprise a plurality of sub-modules and the bus bars 18 can be coupled to one of the sub-modules within a particular inverter module 20.

Each inverter module 20 sends an alternating current to a corresponding bus bar 18. At least some of the bus bars 18 includes the AC current sensor assembly 12 coupled thereto which senses or measures the alternating current flowing through that particular bus bar 18. Although the implementation of FIG. 3 shows some of the bus bars 18 as having AC current sensor assemblies 12 coupled to the bus bars 18, other implementations are possible in which fewer or more AC current sensor assemblies 12s are utilized. For bus bars 18 having AC current sensor assemblies 12 coupled to the bus bars 18, the bus bars 18 can be directly connected to the AC current sensor assemblies 12.

Each bus bar 18 sends the alternating current directly to a corresponding motor winding 16 where it drives or runs the electric motor 10. In this implementation, the dual wound motor 10 is shown as having six inputs, labeled as A, B and C. The six inputs each receive the alternating current from their corresponding motor windings 16.

In this embodiment, each of the motor windings 16 can be made longer and extended out of the electric motor 10. The motor winding 16 can be fed directly into the inverter module (or PIM) and bolted to the bus bar 18 using a fusion lug 13. This can allow for the inverter 20 to be directly mounted onto the motor 10. As a result, the size and cost of the interconnection system can be reduced by eliminating the intermediate bus bars 17 of FIG. 1. In addition, fasteners or other connections, and the resistances associated with the fasteners, can also be eliminated to thereby reduce EMI noise. In addition, crimping of the intermediate bus bars 17 can also be eliminated. Thermal performance can also be improved by eliminating the intermediate bus bars 17.

As noted above, it is desirable to reduce the temperatures which are encountered by the power electronics used in under the hood environments. It would be highly desirable to provide techniques for keeping the adjoining bus bars at temperatures lower than 105 C.

Figure 4:
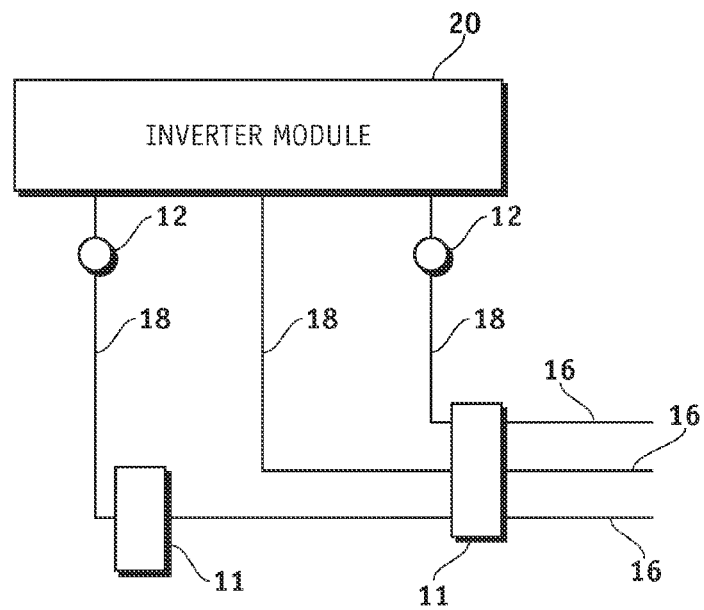
FIG. 4 is a block diagram of an AC interconnection system according to another exemplary embodiment.

FIG. 4 is a block diagram of an AC interconnection system according to another exemplary embodiment in which a thermal interface 11 is used to cool motor windings 16 and bus bars 18 to reduce the likelihood of sensor 12 failure. Although FIG. 4 shows three bus bars 18 and three motor windings 16, it should be appreciated that in a typical implementation, a dual wound motor (not shown) can have a greater number of motor windings 16 which have a corresponding greater number of bus bars 18, as shown above in FIG. 3.

The AC interconnection system comprises a plurality of AC current sensor assemblies 12, a plurality of thermal interfaces 11, a plurality of motor windings 16, and a plurality of bus bars 18. In this implementation each of the thermal interfaces 11 is shown as being coupled to the motor winding 16, and the motor winding 16 is coupled to the bus bar 18. In an alternative implementation, at least some of the thermal interfaces 11 could be coupled to the bus bar 18.

The thermal interfaces 11 may comprise a thermally conductive material and can be used to provide a cooling path to a heat sink (not shown). The thermal interfaces 11 can be disposed along the AC interconnection system to help reduce the temperature of the motor windings 16 and bus bars 18 to prevent the AC current sensor assemblies 12 from failing. As such, the temperature of the motor windings 16 and the bus bars 18 can be reduced, as needed, to prevent failure of the AC current sensor assemblies 12 due to high temperatures in the environment they are used in.

Figure 5:
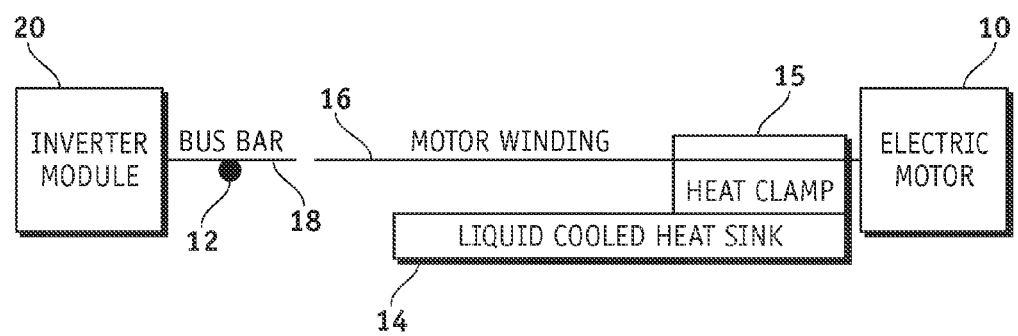
FIG. 5 is a block diagram of a motor system which includes an AC interconnection system according to another exemplary embodiment.

FIG. 5 is a block diagram of a motor system which includes an AC interconnection system according to another exemplary embodiment in which a liquid cooled hear sink 14 and heat clamp 15 are used to cool a motor winding 16 and an bus bar 18. For sake of simplicity, FIG. 5 shows a single liquid cooled heat sink 14, a single heat clamp 15, a single motor winding 16 and a single bus bar 18; however, it should be appreciated that in some implementations, the AC interconnection system could comprise a plurality of AC current sensor assemblies 12, a plurality of heat sinks 14 and heat clamps 15, a plurality of motor windings 16, and a plurality of bus bars 18. For example, the bus bar 18 is shown as being a single bus bar, and the motor winding 16 is shown as being a single winding, however, it should be appreciated that in a typical implementation, a dual wound motor (not shown) has a number of motor windings 16 which have a corresponding number of bus bars 18, as shown below in FIG. 3.

The electric motor system includes an inverter module 20, a bus bar 18, a motor winding 16, a liquid cooled heat sink 14 coupled to the motor winding 16 via a heat clamp 15, and an electric motor 10. The inverter module 20 is coupled to the bus bar 18 which is directly coupled to the motor winding 16 which is part of the electric motor 10.

The inverter module 20 sends an alternating current to the bus bar 18. The bus bar 18 has an AC current sensor assembly 12 coupled to the bus bar 18 which senses or measures the alternating current. The bus bar 18 sends the alternating current directly to the motor winding 16 where it drives or runs the electric motor 10. In this implementation the liquid cooled heat sink 14 is coupled to the motor winding 16 via the heat clamp 15, and the motor winding 16 is coupled to the bus bar 18. In an alternative implementation, the liquid cooled heat sink 14 could be coupled to the bus bar 18 via the heat clamp 15.

The heat clamp 15 comprises a thermally conductive material and is used to provide a cooling action to the motor winding 16 via the liquid cooled heat sink 14. The heat clamp 15 can provide a thermal path from the motor windings or bus bars to the liquid cooled heat sink 14. The heat clamp 15 can be disposed along the AC interconnection system to help reduce the temperature of the motor windings 16 and bus bars 18 to prevent the AC current sensor assemblies 12 from failing.

The liquid cooled heat sink 14 is coupled to the heat clamp 15 and is configured to pull heat energy from the bus bars 18 into a cold fluid which circulates through the liquid cooled heat sink 14. In one implementation, pumping action can be used to circulate or transport a fluid, such as ethylene glycol, through the heat sink to cool it. The liquid cooled heat sink 14 may comprise, for example, a separate radiator which surrounds the bus bars 18 and circulates the fluid at temperature between 55 and 70° C. The heat sink 14 can be made of any conductor, such as aluminum and can have any configuration, such as pin fins.

As such, the temperature of the motor windings 16 and the bus bars 18 can be reduced, as needed, to prevent failure of the AC current sensor assemblies 12 due to high temperatures.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments.

It should also be understood that various changes can be made in the function and arrangement of elements without departing from the scope of the invention as set forth in the appended claims and the legal equivalents thereof. Thus, the present invention is not intended to be limited to the embodiments shown herein but is to be accorded the widest scope consistent with the principles and novel features disclosed herein. Numerical ordinals such as "first," "second," "third,"

etc. simply denote different singles of a plurality and do not imply any order or sequence unless specifically defined by the claim language.

What is claimed is:

1. A high current interconnection system configured to couple a motor to a power inverter module comprising at least one inverter module, comprising:
   a bus bar located outside the at least one inverter module and inside the power inverter module; and
   at least one thermal interface being directly coupled to the bus bar outside the at least one inverter module, the thermal interface being configured to reduce a temperature of the bus bar which the thermal interface is coupled to, wherein the thermal interface comprises:
   a heat clamp comprising a thermally conductive material, the heat clamp being coupled to the bus bar outside the at least one inverter module; and
   a heat sink portion, coupled to the heat clamp, being configured to reduce the temperature of the bus bar.

2. The system of claim 1, further comprising:
   a sensor, coupled directly to the bus bar, configured to sense the current.

3. The system of claim 2, wherein the bus bar is configured to be coupled to the at least one inverter module.

4. The system of claim 1, wherein the heat sink portion comprises a liquid cooled heat sink.

5. A high current interconnection system configured to couple a motor to a power inverter module comprising a plurality of inverter modules each comprising a plurality of inverter sub-modules, comprising:
   a plurality of bus bars located outside the plurality of inverter sub-modules and inside the power inverter module, wherein each of the bus bars is coupled to a corresponding one of the sub-modules and directly receives a current from the corresponding one of the sub-modules the bus bar is coupled to; and
   at least one thermal interface being directly coupled to at least one of the bus bars outside the plurality of inverter sub-modules, the thermal interface being configured to reduce a temperature of the at least one bus bar the thermal interface is coupled to, wherein the thermal interface comprises:
   a heat clamp comprising a thermally conductive material, the heat clamp being coupled to the at least one bus bar outside the plurality of inverter sub-modules; and
   a heat sink portion, coupled to the heat clamp, being configured to reduce the temperature of the at least one bus bar.

6. The system of claim 5, further comprising:
   a plurality of sensors, coupled directly to at least some of the bus bars, wherein each sensor is configured to sense the current flowing in the bus par it is coupled to.

7. The system of claim 5, further comprising:
   a plurality of other thermal interfaces, wherein each of the other thermal interfaces is coupled to at least one of the bus bars, wherein each of the other thermal interfaces is configured to reduce a temperature of the at least one bus bar the other thermal interface is coupled to.

8. The system of claim 5, wherein the heat sink portion comprises a liquid cooled heat sink.

* * * * *